(12) United States Patent
Naples et al.

(10) Patent No.: US 6,422,361 B2
(45) Date of Patent: Jul. 23, 2002

(54) DAMPER, PISTON ASSEMBLY AND METHOD FOR MAKING

(75) Inventors: Mark R. Naples, Dayton; John Michael Sarley, Mason, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/829,444

(22) Filed: Apr. 9, 2001

Related U.S. Application Data

(63) Continuation-in-part of application No. 09/481,110, filed on Jan. 11, 2000.

(51) Int. Cl.$^7$ ................................ F16F 9/32; F16F 9/34
(52) U.S. Cl. ................................................. 188/322.15
(58) Field of Search ....................... 188/322.13, 322.15

(56) References Cited

U.S. PATENT DOCUMENTS

| | | | | |
|---|---|---|---|---|
| 4,460,074 A | * | 7/1984 | Muller et al. | 188/322.15 |
| 4,953,671 A | * | 9/1990 | Imaizumi | 188/322.15 |
| 5,785,160 A | * | 7/1998 | Grundei | 188/322.15 |
| 6,145,638 A | * | 11/2000 | Popjoy | 188/322.13 |

* cited by examiner

*Primary Examiner*—Matthew C. Graham
(74) *Attorney, Agent, or Firm*—Scott A. McBain

(57) ABSTRACT

A damper piston assembly includes a rod, a piston, a rivet disk, and a spring. The piston surrounds the rod between a riveted end and a longitudinal stop of the rod. The piston includes a valve assembly having a valve body with an orifice extending therethrough. The rivet disk surrounds the rod and has an opening for fluid communication with the orifice. The rivet disk is longitudinally secured between the piston and the riveted end of the rod. The spring is positioned in compression longitudinally between the rivet disk and the longitudinal stop of the rod.

8 Claims, 2 Drawing Sheets

DAMPER, PISTON ASSEMBLY AND METHOD FOR MAKING

CROSS REFERENCE TO RELATED APPLICATIONS

The present application is a continuation-in-part application of U.S. patent application Ser. No. 09/481,110 filed Jan. 11, 2000, the entire disclosure of which is incorporated herein by reference.

TECHNICAL FIELD

The present invention relates generally to dampers, and more particularly to a damper piston assembly having a having a rod and a piston.

BACKGROUND OF THE INVENTION

Conventional dampers include dampers having a cylinder containing a damping fluid (such as oil) and having a damper piston assembly including a piston which slideably engages the cylinder. The fluid passes through an orifice of a valve assembly of the piston. Valve assemblies include those having a disk located adjacent the orifice and covering the orifice. Fluid is forced through the orifice when the pressure of the fluid urges the disk away from the orifice. Valve assemblies include those having a compression orifice and a compression disk and a separate rebound orifice and a separate rebound disk. A rod has a first end attached to the piston and a second end extending outside the cylinder. The cylinder and the rod are attached to separate structures to dampen relative motion of the two structures along the direction of piston travel.

In some conventional dampers, the first end of the rod extends through the piston. The first end of the rod has external threads, and a nut is threadably engaged on the first end of the rod to secure the piston longitudinally between the nut and a shoulder of the rod. Typically, the tightened nut exerts a force of generally 2,500 pounds (plus or minus several hundred pounds) on the piston including the valve assembly and including the compression and rebound disks of the valve assembly. However, although the torque applied to the nut can be reasonably controlled, because of thread variations of the nut and tolerances in the parts of the valve assembly, the force on the piston (and on the valve assembly and on the compression and rebound disks) can vary greatly by several hundred pounds from damper to damper.

In other conventional dampers, one end of the piston is welded to the first end of the rod, the valve assembly is positioned in the piston, and the other end of the piston is crimped to retain the valve assembly.

What is needed is a damper piston assembly which is convenient to make and which exerts less force on the piston including the valve assembly.

SUMMARY OF THE INVENTION

In a first expression of a first embodiment of the invention, a damper piston assembly includes a rod, a piston, a rivet disk, and a spring. The rod has a longitudinal axis, a riveted end, and a longitudinal stop. The piston surrounds the rod between the riveted end and the longitudinal stop. The piston includes a valve assembly having a valve body with an orifice extending therethrough. The rivet disk surrounds the rod and has an opening for fluid communication with the orifice. The rivet disk is longitudinally secured between the piston and the riveted end of the rod. The spring is positioned in compression longitudinally between the rivet disk and the longitudinal stop of the rod. In one example, the spring is a Belleville washer.

In a second expression of a first embodiment of the invention, a damper includes a tube and a damper piston assembly. The tube contains a damping fluid. The damper piston assembly includes a rod, a piston, a rivet disk, and a spring. The rod has a longitudinal axis, a riveted end, and a longitudinal stop. The piston is located within, and is slidingly engageable with, the tube. The piston surrounds the rod between the riveted end and the longitudinal stop. The piston includes a valve assembly having a valve body with an orifice extending therethrough. The rivet disk has a hole for fluid communication with the orifice. The rivet disk is longitudinally secured between the piston and the riveted end of the rod. The spring is positioned in compression longitudinally between the rivet disk and the longitudinal stop of the rod. In one example, the spring is a Belleville washer.

One method for making a damper piston assembly includes steps a) through h). Step a) includes providing a rod having a longitudinal axis, a first end, and a longitudinal stop. Step b) includes providing a piston including a valve assembly having a valve body with an orifice extending therethrough and with a mounting hole extending therethrough. Step c) includes mounting the piston on the rod with the first end of the rod extending through the mounting hole of the valve body. Step d) includes mounting a spring on the rod. Step e) includes providing a rivet disk having a mounting hole extending therethrough and having an opening extending therethrough for fluid communication with the orifice. Step f) includes mounting the rivet disk on the rod, after mounting the piston and the spring on the rod. Step g) includes longitudinally moving the rivet disk against the piston compressing the spring with the first end of the rod extending through the mounting hole of the rivet disk. Step h) includes, after step g), peening the first end of the rod against the rivet disk to define a riveted end of the rod. In one example of the first method, step d) is performed after step c), the spring in a relaxed state extends beyond the piston, and there is also included the step of measuring, after step d) and before step f), the force required to compress the spring flush with the piston, and the step, before step f), of mounting a shim disk, as needed, on the rod, wherein the thickness of the shim disk is chosen so that, after step f), the spring exerts a predetermined force.

Several benefits and advantages are derived from the invention. The spring and rivet attachment of the piston (including the valve assembly) to the rod provides a secure attachment with a lower clamp load on the piston (including the valve assembly). A lower clamp load on the valve assembly means less damage to valve components and especially to orifice disks (for those valve assemblies having orifice disks). In one example, the clamp load is generally 250 pounds. The spring and rivet attachment also provides a more precise and repeatable clamp load on the piston (including the valve assembly) regardless of the manufacturing tolerances of the individual components, especially in the example when a shim disk is employed. Having an exact and repeatable clamp load for each manufactured damper piston assembly provides for optimal valve operation (such as optimal orifice disk operation for those valve assemblies having orifice disks). The spring and rivet attachment reduces costs by eliminating the threaded rod of conventional piston assemblies employing threaded rods and simplifies and reduces the costs of assembly equipment compared to conventional weld and crimp or conventional threaded-nut assembly equipment.

DESCRIPTION OF THE PREFERRED EMBODIMENT

Figure 1:
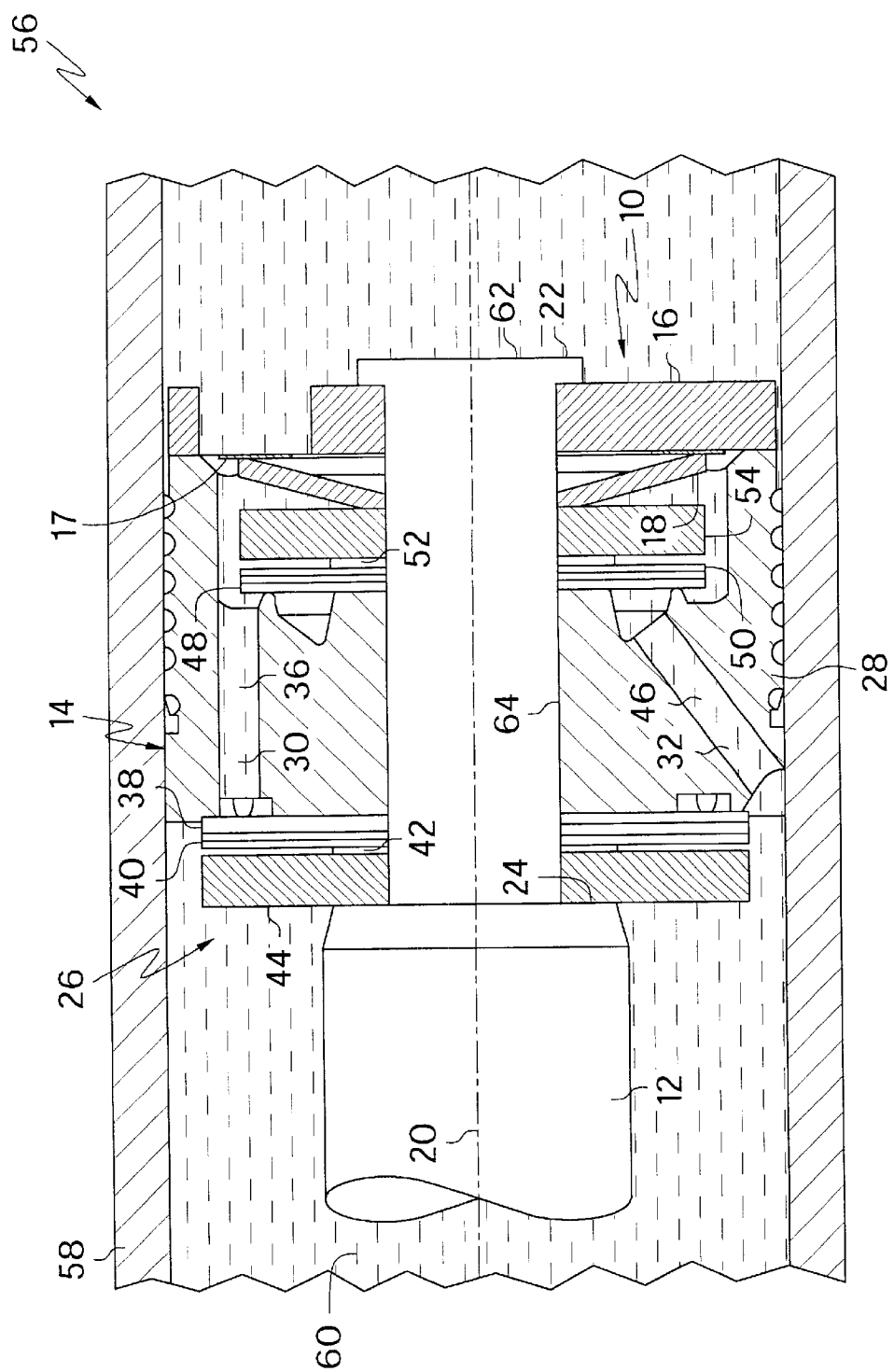
FIG. 1 is a schematic, cross-sectional view of a portion of a first embodiment of the invention including a damper piston assembly.
Figure 2:
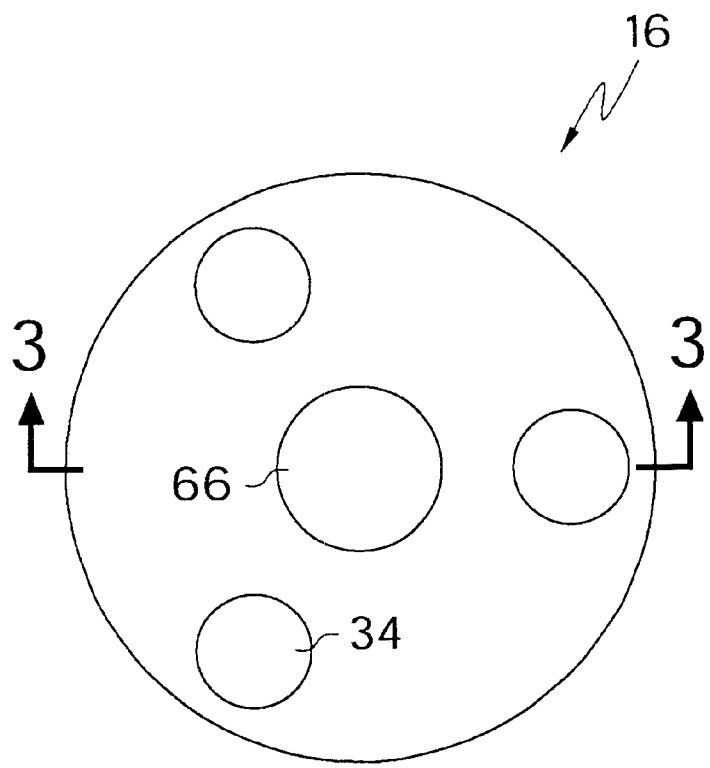
FIG. 2 is a top planar view of the rivet disk of the damper piston assembly of FIG. 1.
Figure 3:
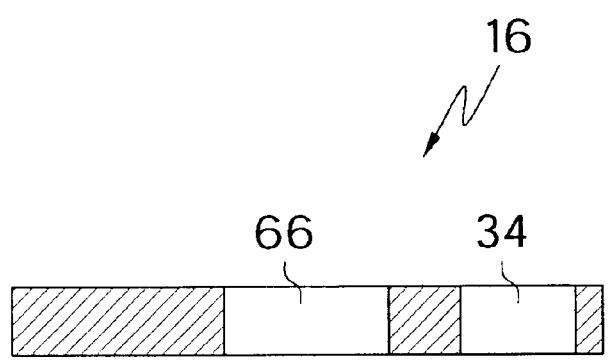
FIG. 3 is a sectional view of the rivet disk of FIG. 2 taken along lines 3—3 of FIG. 2.

Referring now to the drawings, wherein like numerals represent like elements throughout, FIGS. 1 through 3 illustrate a first embodiment of the present invention. In a first expression of the first embodiment shown in the figures, a damper piston assembly 10 includes a rod 12, a piston 14, a rivet disk 16, and a spring 18. The rod 12 has a longitudinal axis 20, a riveted end 22, and a longitudinal stop 24. The piston 14 surrounds the rod 12 between the riveted end 22 and the longitudinal stop 24. The piston 14 includes a valve assembly 26 having a valve body 28 with an orifice 30 or 32 extending therethrough. It is noted that two orifices 30 and 32 are shown in FIG. 1, but that the valve body 28 can have a single orifice, two orifices, or more than two orifices, as can be appreciated by the artisan. The rivet disk 16 surrounds the rod 12 and has an opening 34 for fluid communication with the orifice 30 or 32. The rivet disk 16 is longitudinally secured between the piston 14 and the riveted end 22 of the rod 12. The spring 18 is disposed in compression longitudinally between the rivet disk 16 and the longitudinal stop 24 of the rod 12. A spring 18 disposed in compression means a spring 18 disposed at least partially in compression.

In one construction of the first expression, the rod 12 is a monolithic rod. In other constructions, not shown, the rod includes two or more pieces which are attached together to form the overall rod.

In one design of the first expression, the rivet disk 16 directly contacts the riveted end 22 of the rod 12. In the same or a different design, the rivet disk 16 directly contacts the piston 14. In the same or a different design, the spring 18 directly contacts the rivet disk 16. In other designs, not shown, an intervening part or parts may be disposed between the rivet disk and the riveted end of the rod, the rivet disk and the piston, and the spring and the rivet disk, as can be appreciated by the artisan. In one example, a shim disk 17 is disposed between the spring and the rivet disk.

In one model of the first expression, the spring 18 consists essentially of a Belleville washer. In other models, not shown, the spring includes any apparatus or composition which exerts a spring force when compressed such as, without limitation, a coil spring, a leaf spring, an elastomeric material, and/or a magnetic force spring, etc.

In one depiction of the first expression, the rod 12 is substantially a right-circular cylindrical rod having a larger diameter from the longitudinal stop 24 longitudinally away from the riveted end 22 and having a smaller diameter from the longitudinal stop 24 toward the riveted end 22. In other depictions, not shown, the longitudinal stop is a flange monolithically, directly, or indirectly affixed to the rod. In other depictions, the longitudinal stop is a flange member mounted on the rod and longitudinally disposed against a shoulder of the rod. Still other depictions are left to the artisan.

In one arrangement of the first expression, the orifice 30 is a compression orifice 36, wherein the valve assembly 26 further includes a compression disk 38 located adjacent the valve body 28 and covering the compression orifice 36, and wherein, when the valve assembly 26 is immersed in fluid, fluid can be forced through the compression orifice 36 when the pressure of the fluid urges the compression disk 38 away from the compression orifice 36. It is noted that in one modification to improve piston performance, not shown, the valve assembly 26 provides for fluid leakage even when the compression disk 38 covers the compression orifice 36, as can be appreciated by those skilled in the art. In one variation, the valve assembly 26 includes (starting from the compression disk 38 and longitudinally moving to the longitudinal stop 24) stiffening disks 40, a spacer disk 42, and a compression retainer 44. In one construction, not shown, the compression retainer is monolithically or directly attached to the rod so as to define the longitudinal stop of the rod.

In the same or another arrangement of the first expression, the orifice 32 is a rebound orifice 46 wherein the valve assembly 26 further includes a rebound disk 48 located adjacent the valve body 28 and covering the rebound orifice 46, and wherein, when the valve assembly 26 is immersed in fluid, fluid can be forced through the rebound orifice 46 when the pressure of the fluid urges the rebound disk 48 away from the rebound orifice 46. It is noted that in one modification to improve piston performance, not shown, the valve assembly 26 provides for fluid leakage even when the rebound disk 48 covers the rebound orifice 46, as can be appreciated by those skilled in the art. In one variation, the valve assembly 26 includes (starting from the rebound disk 48 and longitudinally moving toward the rivet disk 16) stiffening disks 50, a spacer disk 52, and a rebound retainer 54, and the spring 18 is disposed longitudinally between the rebound retainer 54 and the rivet disk 16. In another variation, not shown, the spring is disposed longitudinally between any two damper piston assembly elements between the rebound retainer and the rebound disk or any two damper piston assembly elements between the compression disk and the longitudinal stop.

In a second expression of the first embodiment shown in the figures, a damper 56 includes a tube 58 and a damper piston assembly 10. The tube 58 contains a damping fluid 60. An example of a damping fluid includes, without limitation, oil. The damper piston assembly 10 includes a rod 12, a piston 14, a rivet disk 16, and a spring 18. The rod 12 has a longitudinal axis 20, a riveted end 22, and a longitudinal stop 24. The piston 14 is disposed within, and is slidingly engageable with, the tube 58. The piston 14 surrounds the rod 12 between the riveted end 22 and the longitudinal stop 24. The piston 14 includes a valve assembly 26 having a valve body 28 with an orifice 30 or 32 extending therethrough. It is noted that two orifices 30 and 32 are shown in FIG. 1, but that the valve body 28 can have a single orifice, two orifices, or more than two orifices, as can be appreciated by the artisan. The rivet disk 16 surrounds the rod 12 and has an opening 34 for fluid communication with the orifice 30 or 32. The rivet disk 16 is longitudinally secured between the piston 14 and the riveted end 22 of the rod 12. The spring 18 is disposed in compression longitudinally between the rivet disk 16 and the longitudinal stop 24 of the rod 12. It is noted that the previously described constructions, designs, examples, models, depictions, arrangements, modifications, and variations of the first expression are equally applicable to the second expression of the first embodiment shown in the figures.

An application of the damper 56 is its use as a shock absorber for an automobile, an airplane, or other type of vehicle. Another application is use of the damper 56 to provide motion resistance on exercise equipment such as stair climbers and rowing machines. A further application is use of the damper 56 to provide motion isolation for a building, bridge, or other structure subject to earthquakes. An additional application is use of the damper 44 to dampen vibrations encountered by vehicles and structures in outer space. Other applications are left to the artisan. It is noted that the damper 56 (and the damper piston assembly 10) can be adapted or configured to include magnetorheological or other exotic types of damping known or to be invented.

A first method of the invention is for making a damper piston assembly 10 and includes steps a) through h). Step a) includes providing a rod 12 having a longitudinal axis 20, a first end 62, and a longitudinal stop 24. Step b) includes providing a piston 14 including a valve assembly 26 having a valve body 28 with an orifice 30 or 32 extending therethrough and with a mounting hole 64 extending therethrough. Step c) includes mounting the piston 14 on the rod 12 with the first end 62 of the rod 12 extending through the mounting hole 64 of the valve body 28. Step d) includes mounting a spring 18 on the rod 12. Step e) includes providing a rivet disk 16 having a mounting hole 66 extending therethrough and having an opening 34 extending therethrough for fluid communication with the orifice 30 or 32. Step f) includes mounting the rivet disk 16 on the rod 12 after mounting the piston 14 and the spring 18 on the rod 12. Step g) includes longitudinally moving the rivet disk 16 against the piston 14 compressing the spring 18 with the first end 62 of the rod 12 extending through the mounting hole 66 of the rivet disk 16. Compressing the spring 18 means at least partially compressing the spring 18. Step h) includes, after step g), peening the first end 62 of the rod 12 against the rivet disk 16 to define a riveted end 22 of the rod 12. In one example, the first end 62 has a hole (not shown) to help form the riveted end 22 in step h).

In one implementation of the first method, the spring 18 consists essentially of a Belleville washer, and step d) is performed after step c). In the same or another implementation of the first method, the rod 12 of step a) is substantially a right-circular cylindrical rod having a larger diameter from the longitudinal stop 24 longitudinally away from the riveted end 22 and having a smaller diameter from the longitudinal stop 24 toward the riveted end 22.

In the same or another implementation of the first method, the orifice 30 of step b) is a compression orifice 36, wherein the valve assembly 26 of step b) further includes a compression disk 38 located adjacent the valve body 28 and covering the compression orifice 36, and wherein, when the valve assembly 26 is immersed in fluid, fluid can be forced through the compression orifice 36 when the pressure of the fluid urges the compression disk 38 away from the compression orifice 36.

In the same or another implementation of the first method, the orifice 32 of step b) is a rebound orifice 46, wherein the valve assembly 26 of step b) further includes a rebound disk 48 located adjacent the valve body 28 and covering the rebound orifice 46, and wherein, when the valve assembly 26 is immersed in fluid, fluid can be forced through the rebound orifice 46 when the pressure of the fluid urges the rebound disk 48 away from the rebound orifice In the same or another implementation of the first method, step d) is performed after step c), the spring 18 (such as the transversely outer portion of a Belleville spring) in a relaxed state extends beyond the piston 14. In this implementation, the method also includes the step of measuring, after step d) and before step f), the force required to compress the spring 18 flush with the piston 14. In this implementation, the method then includes, before step f), the step of mounting a shim disk 17, as needed, on the rod 12, wherein the thickness of the shim disk is chosen so that, after step h), the spring 18 exerts a predetermined force. In one variation, the valve assembly 26 also includes an orifice disk (e.g., the compression disk 38 or the rebound disk 48) located adjacent the valve body 28 and covering the orifice (e.g., the associated compression orifice 36 or rebound orifice 46), and wherein after step h), the orifice disk experiences the predetermined force of the spring 18. By starting with a spring having a lower than desired installed spring force, this implementation uses a shim disk 17 of appropriate thickness to achieve the desired installed spring force. This compensates for dimensional variations between valve assemblies allowing damper piston assemblies to be made having a consistent desired clamping force on each valve assembly.

Several benefits and advantages are derived from the invention. The spring and rivet attachment of the piston (including the valve assembly) to the rod provides a secure attachment with a lower clamp load on the piston (including the valve assembly). A lower clamp load on the valve assembly means less damage to valve components and especially to orifice disks (for those valve assemblies having orifice disks). In one example, the clamp load is generally 250 pounds. The spring and rivet attachment also provides a more precise and repeatable clamp load on the piston (including the valve assembly) regardless of the manufacturing tolerances of the individual components, especially in the example when a shim disk is employed. Having an exact and repeatable clamp load for each manufactured damper piston assembly provides for optimal valve operation (such as optimal orifice disk operation for those valve assemblies having orifice disks). The spring and rivet attachment reduces costs by eliminating the threaded rod of conventional piston assemblies employing threaded rods and simplifies and reduces the costs of assembly equipment compared to conventional weld and crimp or conventional threaded-nut assembly equipment.

The foregoing description of a method and several expressions of an embodiment of the invention has been presented for purposes of illustration. It is not intended to be exhaustive or to limit the invention to the precise procedure or form disclosed, and obviously many modifications and variations are possible in light of the above teaching. It is intended that the scope of the invention be defined by the claims appended hereto.

What is claimed:

1. A method for making a damper piston assembly comprising the steps of:
   a) providing a rod having a longitudinal axis, a first end, and a longitudinal stop;
   b) providing a piston including a valve assembly having a valve body with an orifice extending therethrough and with a mounting hole extending therethrough;
   c) mounting the piston on the rod with the first end of the rod extending through the mounting hole of the valve body;
   d) mounting a spring on the rod,
   e) providing a rivet disk having a mounting hole extending therethrough and having an opening extending therethrough for fluid communication with the orifice;
   f) mounting the rivet disk on the rod after mounting the piston and the spring on the rod;
   g) longitudinally moving the rivet disk against the piston compressing the spring with the first end of the rod extending through the mounting hole of the rivet disk; and h) after step g), peening the first end of the rod against the rivet disk to define a riveted end of the rod.

2. The method of claim 1, wherein the spring consists essentially of a Belleville washer, and wherein step d) is performed after step c).

3. The method of claim 1, wherein the rod of step a) is substantially a right-circular cylindrical rod having a larger diameter from the longitudinal stop longitudinally away from the riveted end and having a smaller diameter from the longitudinal stop toward the riveted end.

4. The method of claim 1, wherein the orifice of step b) is a compression orifice, wherein the valve assembly of step b) further includes a compression disk located adjacent the valve body and covering the compression orifice, and wherein, when the valve assembly is immersed in fluid, fluid can be forced through the compression orifice when the pressure of the fluid urges the compression disk away from the compression orifice.

5. The method of claim 1, wherein the orifice of step b) is a rebound orifice, wherein the valve assembly of step b) further includes a rebound disk located adjacent the valve body and covering the rebound orifice, and wherein, when the valve assembly is immersed in fluid, fluid can be forced through the rebound orifice when the pressure of the fluid urges the rebound disk away from the rebound orifice.

6. The method of claim 5, wherein the valve body of step b) also includes a compression orifice, wherein the valve assembly of step b) further includes a compression disk located adjacent the valve body and covering the compression orifice, and wherein, when the valve assembly is immersed in fluid, fluid can be forced through the compression orifice when the pressure of the fluid urges the compression disk away from the compression orifice.

7. The method of claim 1, wherein step d) is performed after step c), wherein the spring in a relaxed state extends beyond the piston, and also including the steps of:

measuring, after step d) and before step f), the force required to compress the spring flush with the piston; and then, before step f), mounting a shim disk, as needed, on the rod, wherein the thickness of the shim disk is chosen so that, after step h), the spring exerts a predetermined force.

8. The method of claim 7, wherein the valve assembly also includes an orifice disk located adjacent the valve body and covering the orifice, and wherein after step h), the orifice disk experiences the predetermined force of the spring.

* * * * *